United States Patent
Yang et al.

(10) Patent No.: US 8,102,803 B2
(45) Date of Patent: Jan. 24, 2012

(54) METHOD AND APPARATUS FOR WIRELESS COMMUNICATION OF PACKET DATA USING TRANSMIT DIVERSITY WEIGHTING

(75) Inventors: Rui Yang, Greenlawn, NY (US); Robert A. DiFazio, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 847 days.

(21) Appl. No.: 12/130,396

(22) Filed: May 30, 2008

(65) Prior Publication Data

US 2008/0298317 A1 Dec. 4, 2008

Related U.S. Application Data

(60) Provisional application No. 60/941,063, filed on May 31, 2007.

(51) Int. Cl.
*H04W 4/00* (2009.01)
(52) U.S. Cl. .......................... 370/329; 370/469
(58) Field of Classification Search .............. 370/329, 370/335, 469; 455/13.4, 63.4, 277.1, 272, 455/423.455, 513, 562, 562.1; 342/378
See application file for complete search history.

(56) References Cited

U.S. PATENT DOCUMENTS

| | | | | |
|---|---|---|---|---|
| 6,088,344 A * | 7/2000 | Wales et al. | | 370/329 |
| 6,192,256 B1 * | 2/2001 | Whinnett | | 455/562.1 |
| 6,404,387 B1 * | 6/2002 | Kihira et al. | | 342/378 |
| 6,892,059 B1 * | 5/2005 | Kim et al. | | 455/272 |
| 2002/0187812 A1 * | 12/2002 | Guo | | 455/562 |
| 2003/0092382 A1 * | 5/2003 | Vayanos et al. | | 455/13.4 |
| 2003/0148770 A1 * | 8/2003 | Das et al. | | 455/455 |
| 2005/0054359 A1 * | 3/2005 | Ishii et al. | | 455/513 |
| 2005/0075103 A1 * | 4/2005 | Hikokubo et al. | | 455/423 |
| 2005/0143037 A1 * | 6/2005 | Stratis et al. | | 455/277.1 |
| 2005/0163161 A1 * | 7/2005 | Wei et al. | | 370/469 |
| 2005/0266799 A1 * | 12/2005 | Hara et al. | | 455/63.4 |
| 2006/0251027 A1 * | 11/2006 | Chun et al. | | 370/335 |

* cited by examiner

*Primary Examiner* — Andrew Lai

(74) *Attorney, Agent, or Firm* — Volpe and Koenig, P.C.

(57) ABSTRACT

A method and apparatus for transmit diversity in packet data communications includes applying an initial transmit antenna weight. A link adaptation signal is received and analyzed. A transmit antenna weight change is determined based upon the analysis of the link adaptation signal, and the transmit antenna weight is updated based upon the determination.

36 Claims, 6 Drawing Sheets

METHOD AND APPARATUS FOR WIRELESS COMMUNICATION OF PACKET DATA USING TRANSMIT DIVERSITY WEIGHTING

CROSS REFERENCE TO RELATED APPLICATIONS

This application claims the benefit of U.S. Provisional Application No. 60/941,063, filed May 31, 2007, which is incorporated by reference as if fully set forth.

FIELD OF INVENTION

The present invention is related to wireless communications.

BACKGROUND

Data packet access schemes that employ selective retransmissions to communicate data packets are widely used in wired and wireless communication systems to provide more efficient use of resources and high data rate services. Commonly used technologies in, for example, a Third Generation Partnership Project (3GPP) compliant system include Adaptive Modulation and Coding (AMC), Hybrid Automatic Repeat Request (HARQ), and serving grant allocation.

To enable HARQ, a data receiver sends control signals back to a data transmitter to acknowledge if the data was received successfully or not. Such signals may be a single bit and are commonly referred to as acknowledgment/negative acknowledgment (ACK/NACK) signals. If the data transmitter receives a NACK, the same packet of data, with possible change of data rate matching and bit rearrangement, is sent again. Otherwise, a new packet of data is sent. The success or failure of data reception is primarily driven by the propagation channel condition and overall signal-to-noise plus interference ratio. To enable AMC, the data receiver sends a channel quality indicator (CQI) to the data transmitter, by which the data transmitter can adaptively select a proper data packet size and modulation type to achieve higher throughput.

Additionally, to enable serving grant allocation, such as that used in high speed uplink packet access (HSUPA), a NodeB informs a user equipment (UE) of the maximum allowed transmit power to maintain high quality of the service in terms of data throughput, as well as to reduce the interference among users.

In wireless communication, many techniques have been developed to mitigate the impact from propagation channel conditions. One technique developed for frequency domain duplex (FDD) wireless communications is closed-loop transmit diversity. In this technique, a data packet in an FDD wireless communication signal is transmitted from a first unit over multiple antennas with a selected complex weight applied to each of the antennas. The complex weights are generated at the data receiver of a second unit based on signals received from the first unit to meet certain criteria, such as to maximize the received signal-to-noise ratio. The weights generated by the second unit are sent back to the first unit to be applied to the first unit's data transmission, forming the closed-loop.

FIG. 1 illustrates an example functional block diagram where a first wireless transmit receive unit (WTRU) 10 has a data transmitter 12 that transmits data packets over two transmit antennas 14a, 14b where selected weights are applied to the transmissions from the antennas 14a, 14b via respective mixers, 15a, 15b. The first WTRU 10 also includes a receiver 16 which is configured to receive feedback response, such as ACK/NACK signals and CQIs as well as antenna weights generated by a second WTRU 20 that receives the transmitted signals from the first WTRU 10. The receiver 16 distributes the ACK/NACK signals and CQIs to the transmitter 12 via path 17 and the received antenna weights to the mixers 15a, 15b, via path 18. Accordingly, in addition to having a packet data receiver 22, the second WTRU 20 has a feedback generator 24 configured to generate the responsive ACK/NACK signals and CQIs as well as to generate the antenna weights that are to be applied to the transmissions from the first WTRU 12. This type of transmit diversity can achieve a performance gain from both spatial diversity and beamforming.

One issue with the transmit diversity scheme depicted in FIG. 1, however, is that it increases the required direct signaling from the data receiver, which is part of overhead to the communication link. In addition, to reduce the feedback overhead, the granularity of the feed back information for the antenna weight is usually very low.

It would therefore be beneficial to provide a method and apparatus for packet data transmission using transmit diversity weighting without explicit signaling of antenna weights.

SUMMARY

A method and apparatus for transmit diversity in packet data communications is disclosed. The method includes applying an initial transmit antenna weight. A link adaptation signal is received and analyzed. A transmit antenna weight change is determined based upon the analysis of the link adaptation signal, and the transmit antenna weight is updated based upon the determination.

BRIEF DESCRIPTION OF THE DRAWINGS

A more detailed understanding may be had from the following description, given by way of example in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, an ultra mobile personal computer (UMPC), a mobile Internet device (MID), or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
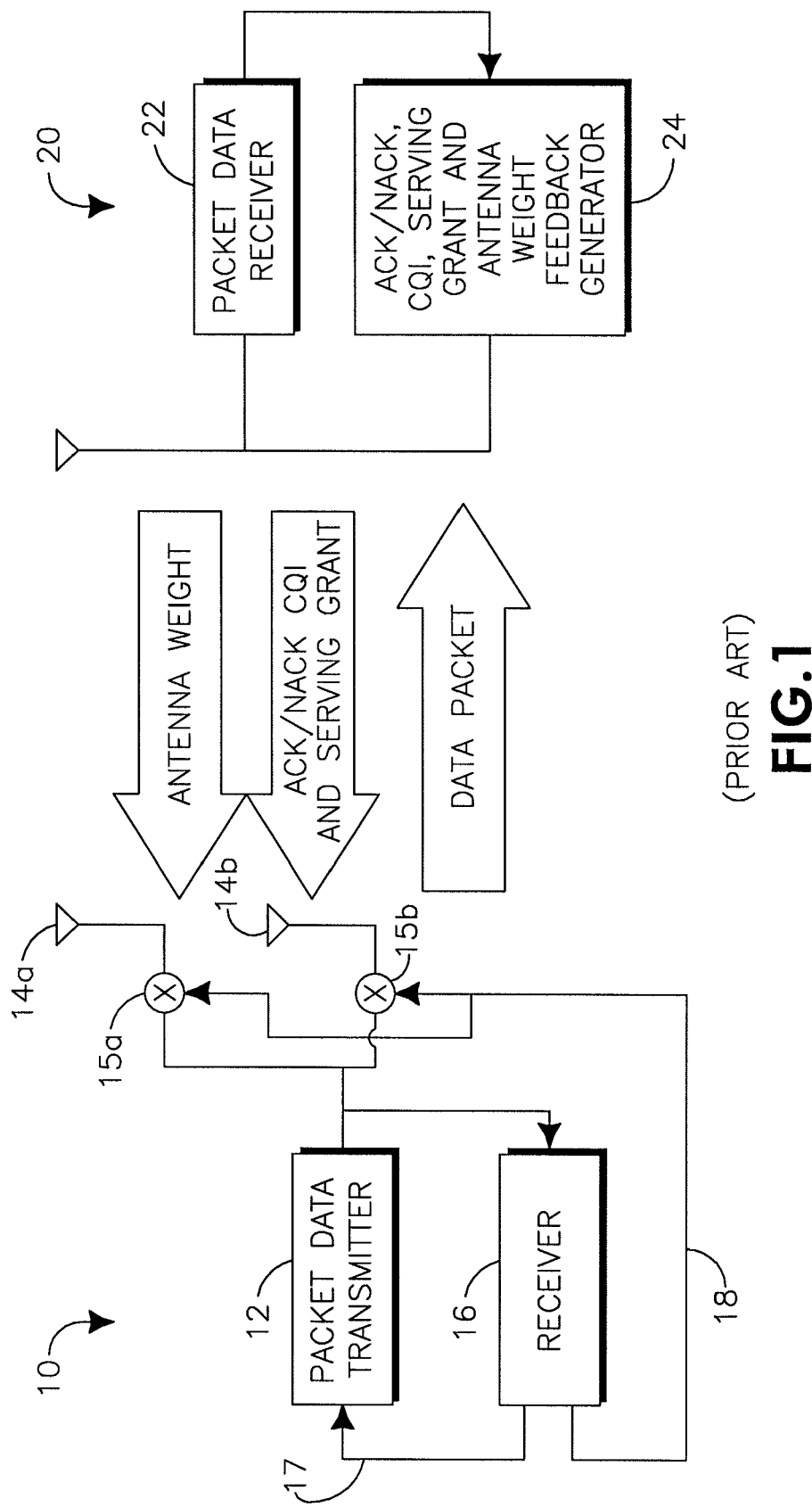
FIG. 1 is a prior art functional block diagram illustrating conventional transmit diversity packet data communication where transmission antenna weights are communicated back to a packet data transmitting WTRU by a packet data receiving WTRU.
Figure 2:
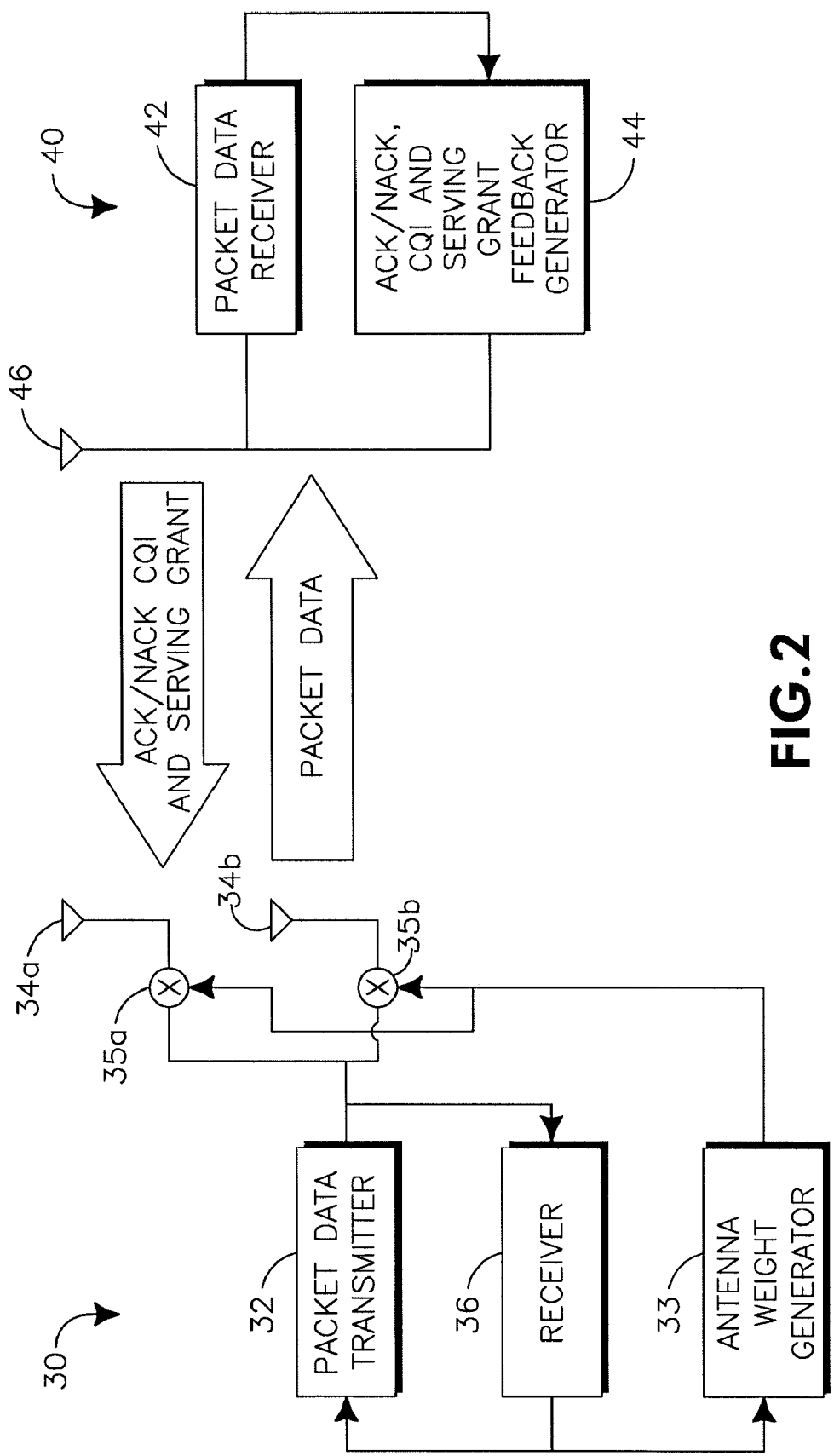
FIG. 2 is an example functional block diagram of a pair of WTRUs performing wireless communication of packet data using transmit diversity.

FIG. 2 is an example functional block diagram of a pair of WTRUs, (designated 30 and 40, respectively), performing wireless communication of packet data using transmit diversity. Although the methods and embodiments described below are in terms of a transmitting WTRU 30 and a receiving WTRU 40, either WTRU may be configured to operate with the functionality to both transmit and receive data packets. The WTRUs (30, 40) described below may be mobile or stationary WTRUs configured for uplink, as a down link receiver, and/or for peer to peer wireless packet data communications.

The WTRU 30 is configured with a packet data transmitter 32, an antenna weight generator 33, and an antenna array having first and second antennas 34a, 34b, which control the transmission of data packets from the WTRU 30. For each transmission or retransmission of a data packet by the packet data transmitter 32 over the antennas 34a, 34b, the antenna weight generator 33 generates antenna weights which are applied to the respective antennas 34a, 34b via respective mixers, 35a, 35b. Although an antenna array having two antennas is shown as an example, any number of additional antennas may be provided in the antenna array. In such a case, the packet data transmitter 32 and antenna weight generator 33 are configured to provide weighted signals for transmitting a data packet over each additional antenna, for example with an equal number of additional mixers for applying the additional weights generated by the antenna weight generator 33 to each respective additional antenna of the antenna array.

The WTRU 30 also includes a receiver 36 that is configured to receive, among other things, signals that indicate whether a data packet transmitted or retransmitted by the WTRU 30 was successfully received by another WTRU, such as WTRU 40 in FIG. 2. The WTRU 40 includes a packet data receiver 42 and an acknowledgement, CQI, and serving grant feedback signal generator 44 which are configured to respectively receive data packets and generate and send data packets containing the feedback signals via an antenna 46. Although not shown, both WTRU 30 and WTRU 40 may include functionally analogous sets of components such that WTRU 40 can also selectively transmit and retransmit data packets using transmit diversity to WTRU 30 which in turn can also receive and acknowledge data packet transmissions from WTRU 40.

The WTRU 30 may be configured to use Hybrid Automatic Repeat Requests (HARQ) or Automatic Repeat Requests (ARQ) for controlling retransmissions of data packets and its receiver 36 may be configured to receive Acknowledgement/Non-Acknowledgement (Ack/Nack) signals to indicate whether or not the data packet was successfully received. In this case, the antenna weight generator is configured to generate antenna weights based on received Ack/Nack signals. Additionally, discontinuous (DTX) signaling may be considered to be similar to that of a Nack.

Through the use of the antenna weight generator 33, the receiving WTRU 40 may respond with minimal feedback such as a one bit ACK/NACK signal that is required for HARQs. Additionally, other link adaptation signaling employed for other communication purposes, such as CQIs can also be used in the generation of antenna weights by the transmitting WTRU 30. In addition, relative grant or absolute grant signals, (e.g., serving grants), such as those used in a 3GPP High-Speed Uplink Packet Access (HSUPA) compliant system, can also be used in the generation of antenna weights by the transmitting WTRU 30.

In diversity transmission, using selected antenna weights can improve or degrade the overall equivalent propagation channel quality, where improving the quality may result in better reception of data. Due to the change in equivalent propagation channel quality, applying different antenna weights can yield different ACK/NACK, CQI feedback, or serving grant, as the response of different antenna weights. In other words, one can consider ACK/NACK, CQI and serving grant as functions of antenna weights:

$$\text{ACK/NACK}=f(\text{antenna weights}) \; \text{CQI}=g(\text{antenna weights}) \; \text{Serving Grant}=h(\text{antenna weights}).$$

Equation (1)

Accordingly, the antenna weight generator 33 is configured to generate adjusted combinations of antenna weights for transmissions of a data packet based on the receipt of Ack/Nack signals indicating whether the data packet was received or received successfully, CQI signals indicating the channel quality for transmitting the data packet, or serving grants indicating the maximum transmit power the transmitter is allowed. The functions f(antenna weights), g(antenna weights) and h(antenna weights) are usually unknown, and do not generally need to be known, but the antenna weight generator 33 attempts to generate weights that maximize (or minimize) one or more of such functions.

The antenna weight generator 33 may be configured to apply algorithms/rules, similar to those used in Fuzzy Logic, approximate gradient searches, or "trial and error" methods in the generation of antenna weight combinations that are applied to the transmission and retransmission of data packets by WTRU 30. For example, the antenna weights can be generated based on CQI value and ACK/NACK statistics (e.g. the rate of ACKs or NACKs), or ACK/NACK values for a fixed CQI value, or the change of the serving grant. The control logic preferably is geared towards minimizing the rate of NACKs, maximizing the rate of ACKs, maximizing the CQI value, or minimizing the serving grant. The complexity of the algorithm employed by the antenna weight generator 33 is a matter of design choice. FIGS. 3, 4, 5, and 6 below illustrate example methods for achieving the criteria described above.

Figure 3:
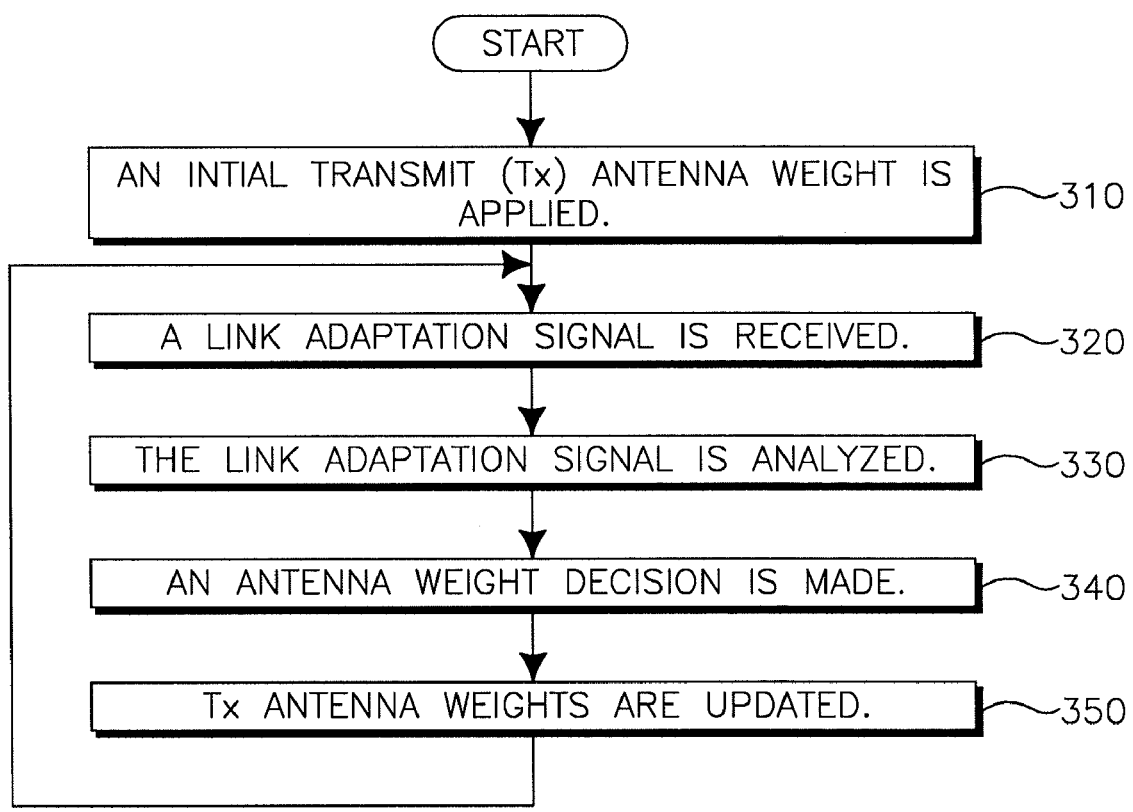
FIG. 3 is a flow diagram of a method for wireless communication of packet data using transmit diversity.

FIG. 3 is a flow diagram of a method 300 for wireless communication of packet data using transmit diversity. The method 300 may be implemented by the WTRUs 30 and 40 of FIG. 2 or by other wireless devices. In step 310, an initial transmit (Tx) antenna weight is applied. In step 320, a link adaptation signal is received, (e.g., a HARQ ACK/NACK, an CQI report, a serving grant, and the like). The link adaptation signal is analyzed (step 330), and an antenna weight decision is made (step 340). After the antenna weight decision is made, antenna weights are updated (step 350). The method then may proceed back to step 320 and continue indefinitely.

The example methods described in FIGS. 4, 5, and 6 below relate to a transmitter 30 that includes two transmit antennas, (e.g., 34a and 34b). The weight applied to the second antenna, (e.g., 34b), is a constant and real number, (e.g., $1/\sqrt{2}$). The weight applied to the first antenna, (e.g., 34a), may be adjusted by changing the phase ($\Phi$) of the first antenna. The amplitude of the antenna may also be adjusted in addition to, or alternatively to, the phase adjustment.

Figure 4:
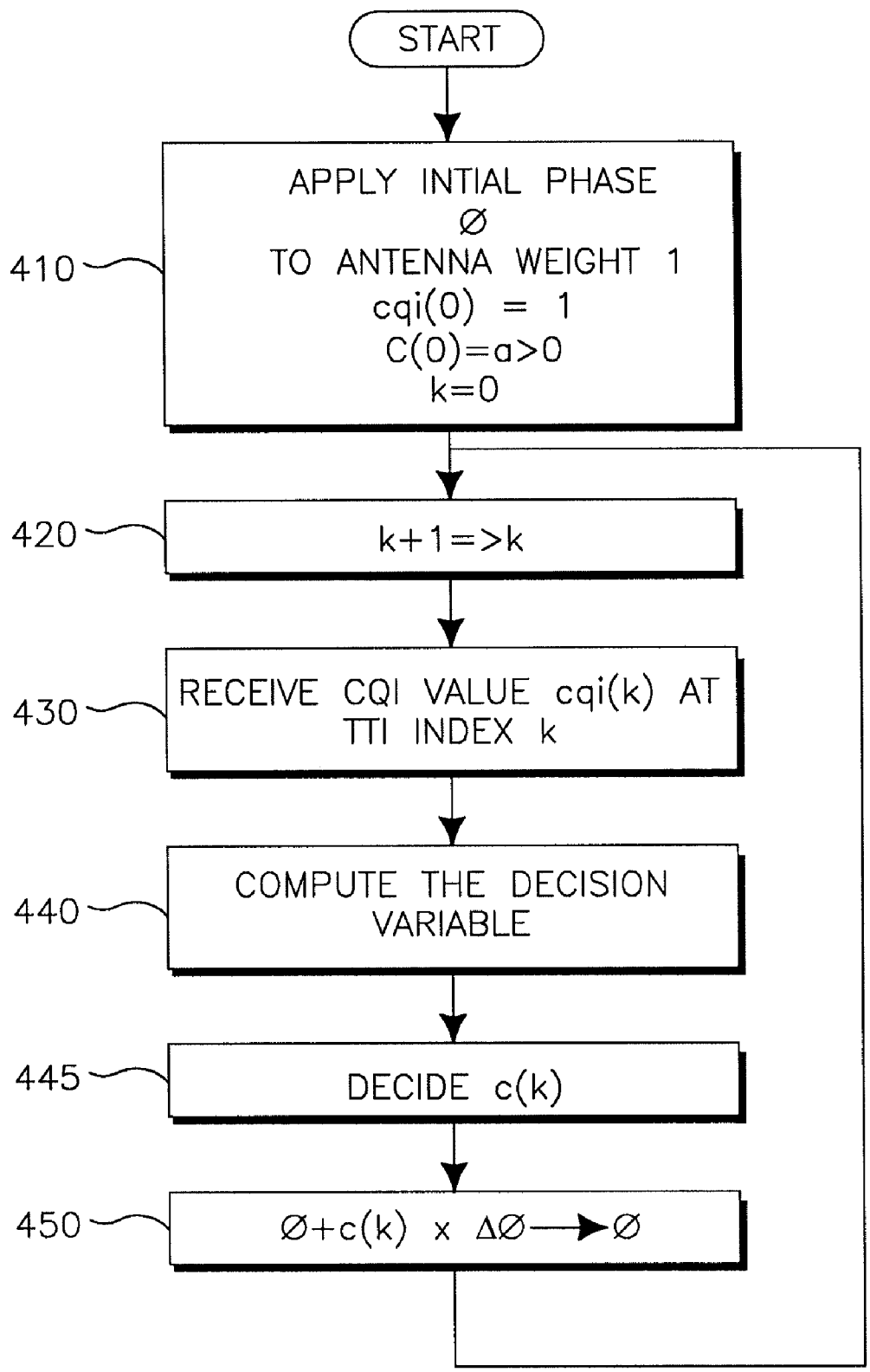
FIG. 4 is a flow diagram of a method for wireless communication of packet data using a CQI value for transmit diversity.
Figure 5:
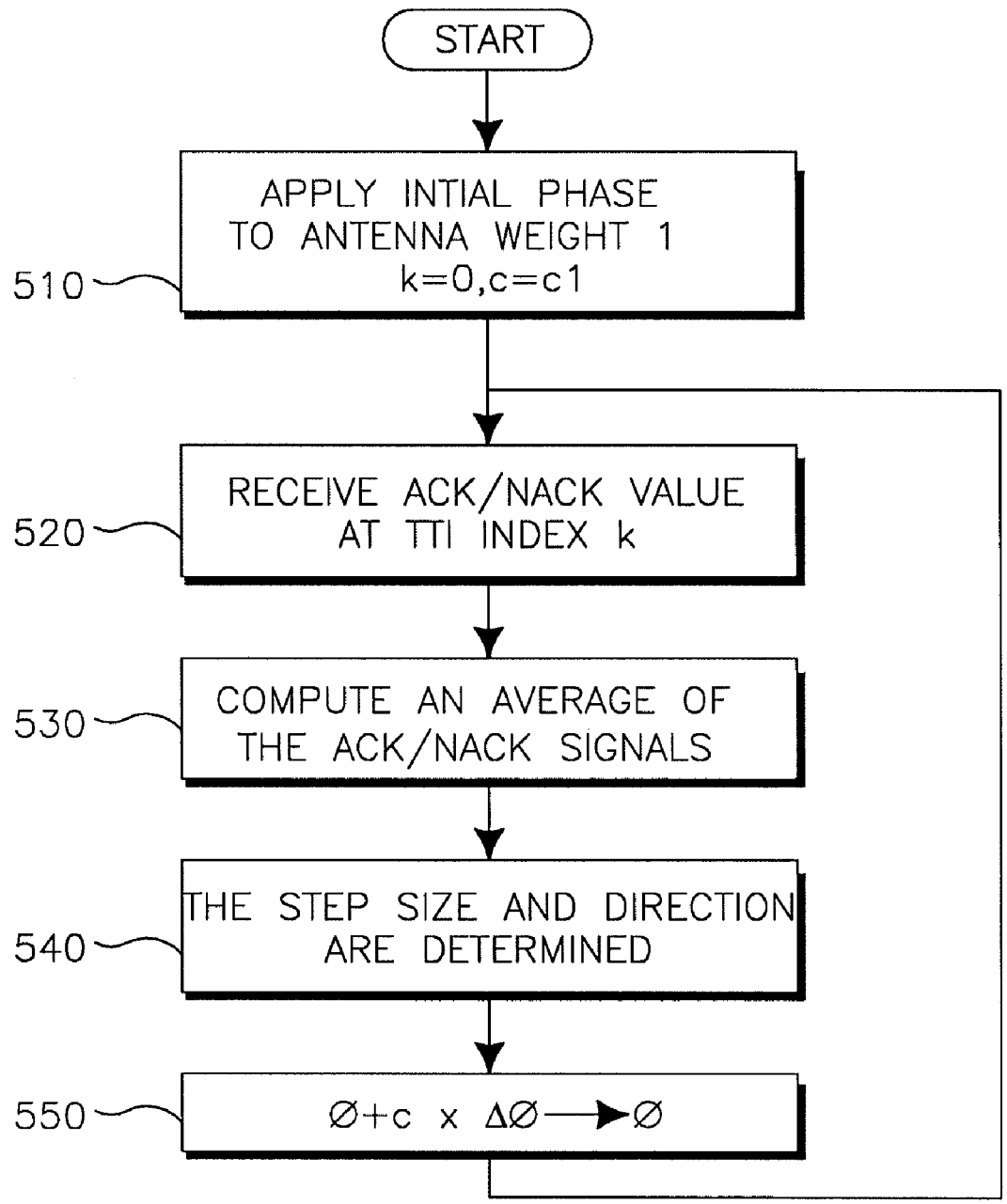
FIG. 5 is a flow diagram of a method for wireless communication of packet data using a received ACK/NACK for transmit diversity.

FIG. 4 is a flow diagram of a method 400 for wireless communication of packet data using a CQI value for transmit diversity. An initial phase ($\Phi$) is applied to antenna weight one (1), with index k equal to zero (step 410), and the initial values of two parameters cqi(k) and c(k) are set as follows:

$$cqi(0)=1; c(0)=a>0;$$

Equation (2)

where "a" is a design parameter to control convergence speed and stability. In step 420, the transmission time interval (TTI) index "k" is incremented by one (1), (i.e., k+1=>k). The CQI value cqi(k) is received at TTI index k (step 430). The CQI value, which in one example, may be valued from 1 to 30 is generated based on an effective channel. In step 440, the decision variable, Dcqi(k), is computed in accordance with the following equation:

$$Dcqi(k)=cqi(k)-cqi(k-1). \quad \text{Equation (3)}$$

As an example, the strategy for weighting could be that if Dcqi is zero or positive, then the phase of the antenna weight on antenna one, (e.g., 34a), rotates in a first direction. If Dcqi is negative, then the phase of the antenna weight on antenna one rotates in a second direction, which may be opposite to the first, direction. That is, $$Dcqi \geq 0, c(k)=c(k-1); \text{ or}$$

$$Dcqi<0, c(k)=-c(k-1). \quad \text{Equation (4)}$$

Accordingly, in step 445, the decision c(k) is made. In step 450, the phase of antenna one is adjusted incrementally in accordance with the following equation:

$$\Phi+c(k)\Delta\Phi \rightarrow \Phi; \quad \text{Equation (5)}$$

where $\Delta\Phi$ is the phase increment.

As an alternative, the decision variable may be selected as an averaged change of reported CQI value, avgDcqi, which measures the trend of CQI variation. The avgDcqi may be measured in accordance with the following equation:

$$avgDcqi = \frac{1}{k'} \sum_{j=k-k'}^{k} Dcqi(j); \quad \text{Equation (6)}$$

where k' is a design parameter, and the above equation may perform a filtering function. The strategy for weighting, then, may be that if avgDcqi is larger than certain value, b, then the phase of the antenna weight on antenna one rotates in a first direction. If the avgDcqi is less than b, then the phase of the antenna weight on antenna one rotates in a second direction, which may be opposite to the first, direction. The following example equations may be employed to determine the rotation of the phase of the antenna weight on antenna one:

$$avgDcqi \geq b, c(k)=c(k-1); \text{ or}$$

$$avgDcqi<b, c(k)=-c(k-1); \quad \text{Equation (7)}$$

after which, steps 445 and 450 may be performed.

In another example, HARQ ACK/NACK feedback may be utilized to adjust the antenna weights. FIG. 5 is a flow diagram of a method 500 for wireless communication of packet data using a received ACK/NACK for transmit diversity.

Similarly to step 410 of the method 400, in step 510, an initial phase $\Phi$ is assigned to antenna weight one and the sign is set to one (1) and index k is set to zero. Index k may then be incremented, (i.e., k+1=>k). At TTI index k, an ACK/NACK value, ack(k), is received (step 520). The ack(k) value may be equal to zero, such as in a NACK or a discontinuous transmission (DTX), or a one, such as in an ACK. An average of the ACK/NACK signals is computed (step 530) in accordance with the following equation:

$$avgAck = \frac{1}{k'} \sum_{j=k-k'}^{k} ack(j); \quad \text{Equation (8)}$$

where k' is a design parameter.

In step 540, the step size and direction are determined in accordance with Table 1 below, where the decision, (e.g., c=c1, or c=-c1, or c=c2, or c=-c2), is determined and c1 is less than c2:

TABLE 1

| avgAck | ack(k − 1) | ack(k) | c |
|---|---|---|---|
| >=a | 0 | 0 | c2 |
| >=a | 0 | 1 | c1 |
| >=a | 1 | 0 | −c1 |
| >=a | 1 | 1 | c1 |
| <a | 0 | 0 | c2 |
| <a | 0 | 1 | c2 |
| <a | 1 | 0 | −c2 |
| <a | 1 | 1 | c2 |

The phase angle change (step 550) is then set in accordance with the equation:

$$\Phi+c\times\Delta\Phi \rightarrow \Phi. \quad \text{Equation (9)}$$

In the above table, using two values, c1 and c2 may provide the flexibility to provide a larger value (c2) to reduce convergence time and a smaller value (c1) to reduce pattern variation when the method is at or near an acceptable operating point. In general, optimum values of c1 and c2 can be determined based on system requirements such as the expected level of interference+noise, channel conditions, and the like. In addition, the values may be fixed or adjusted based on measurements of parameter values.

The serving grant may be used to track a maximum amount of resources a receiver is allowed to use. In a WCDMA HSPA system, it may be expressed as a maximum power ratio of the HSUPA data channel (E-PDPCH) over the dedicated control channel (DPCCH). Since reducing the transmission power may reduce interference at the receiver, it may be desirable to lower the serving grant while maintaining the same quality of service, (e.g., the same or higher data rate). In WCDMA HSUPA, a serving grant may be an absolute or relative grant. The absolute grant is used for absolute changes of the serving grant, while the relative grant is used for changing the serving grant relative to a previous serving grant. Accordingly, to steer the transmit antenna's phase, the change of an absolute grant as a decision variable or the relative grant with proper filtering, may be utilized.

Figure 6:
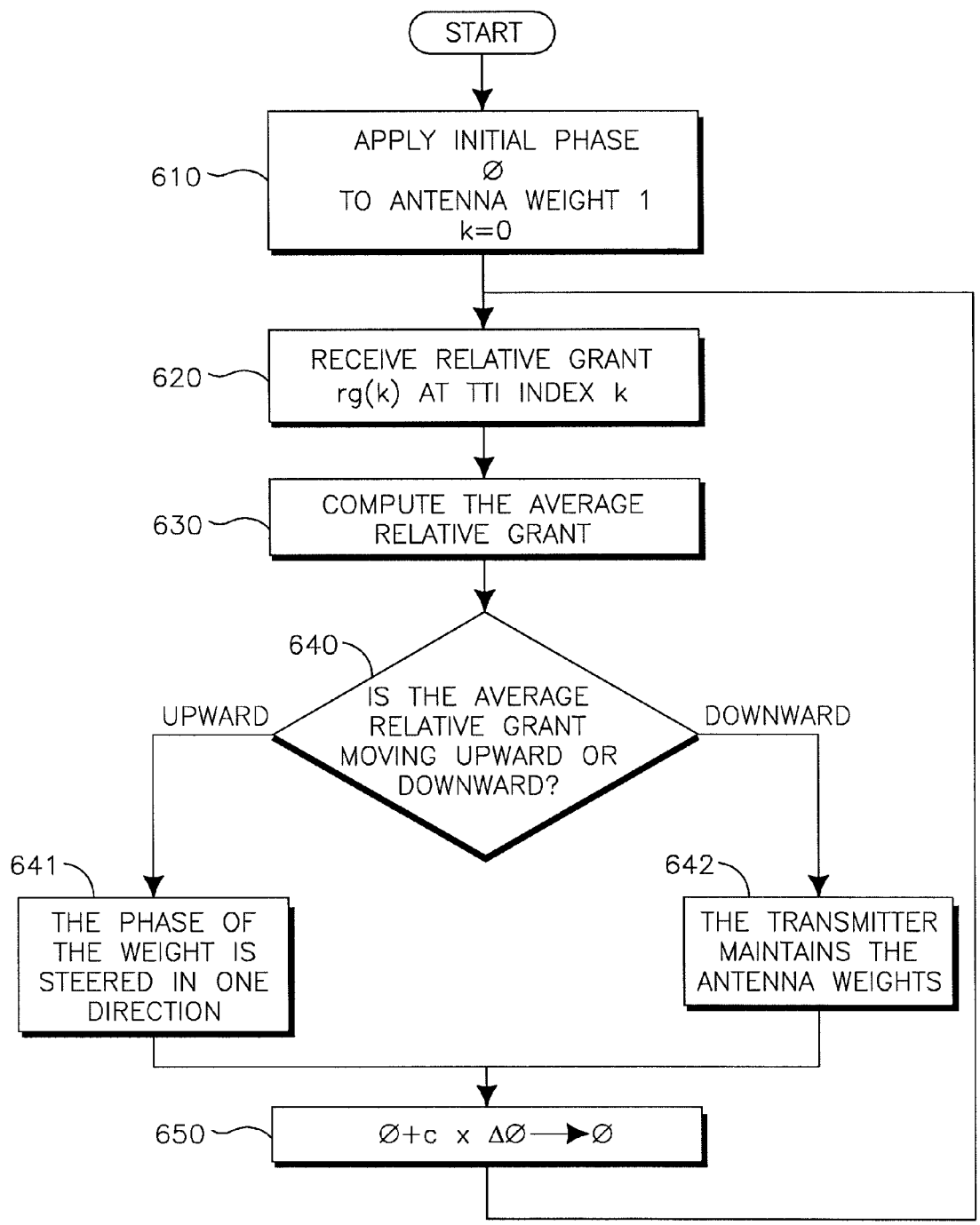
FIG. 6 is a flow diagram of a method for wireless communication of packet data using a received serving grant for transmit diversity.

FIG. 6 is a flow diagram of a method 600 for wireless communication of packet data using a received relative grant for transmit diversity. In step 610, an initial phase $\Phi$ is assigned to antenna weight one, and the index k is set to zero. Index k may then be incremented, (i.e., k+1=>k). In step 620, a relative grant, rg(k), is received at a TTI index k. If received from a serving cell, rg(k) being equal to minus one (−1), then it is indicative of a "DOWN" grant, rg(k) being equal to zero (0) is indicative of a "HOLD" and rg(k) equal to one (1) is indicative of an "UP" grant. For a non-serving cell, rg(k) equal to −1 indicates "DOWN" and rg(k) equal to 1 indicates "UP".

In step 630, an average relative grant, avgRg, is computed in accordance with the following equation:

$$avgRg = \frac{1}{k'} \sum_{j=k-k'}^{k} rg(j);$$ Equation (10)

where k' is a design parameter. The above equation may also perform a filtering function.

In step 640, it is determined whether or not the relative grant is trending upward or downward in accordance with the calculation in step 630. If the relative grant is moving upward, (i.e., avgRg≧d, where d is a design constant parameter), then a constant 'c' is set to a value 'a', which is a positive number (step 641). If the relative grant is trending downward, (i.e., avgRg<d), then 'c' is set to zero (step 642).

The phase angle change (step 550) is then set in accordance with the equation:

$$\Phi + c \times \Delta\Phi \rightarrow \Phi.$$ Equation (11)

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU), comprising:
   a transmitter having a plurality of antennas;
   an antenna weight generator configured to generate antenna weight combinations based upon received link adaptation signals, wherein the link adaptation signal includes at least one of the following signals: a hybrid automatic repeat request (HARQ) acknowledgement signal, a channel quality indicator (CQI) signal, or a serving grant signal; and
   a processor configured to compute an average of the received HARQ acknowledgement signals, wherein on a condition that the average of the received HARQ acknowledgement signals is greater than or equal to a threshold value, updating a transmit antenna weight a first step size.

2. The WTRU of claim 1, further comprising:
   a receiver configured to receive a signal indicating whether a data packet is successfully received by a second WTRU, and wherein the antenna weight generator is further configured to generate antenna weights based upon a condition that the data packet is not successfully received by the second WTRU.

3. The WTRU of claim 2 wherein the transmitter is further configured to selectively transmit and retransmit the data packet from the plurality of antennas, wherein a selected combination of weights generated by the antenna weight generator is applied to the plurality of antennas for transmission of the data packet.

4. The WTRU of claim 3, wherein the WTRU is configured for high speed packet data access communications using hybrid automatic repeat requests (HARQs), wherein the receiver is further configured to receive acknowledgment/negative acknowledgments (ACK/NACKs) in response to a transmission or retransmission of the data packet and the antenna weight generator is further configured to generate antenna weights using received ACK/NACKs.

5. The WTRU of claim 3, wherein the WTRU is configured for adaptive modulation and coding (AMC), wherein the receiver is further configured to receive channel quality indicators (CQIs) and the antenna weight generator is further configured to generate antenna weights using the CQIs.

6. The WTRU according to claim 4 wherein the antenna weight generator is configured to generate antenna weights using ACK/NACK statistics including a rate of NACK.

7. The WTRU according to claim 5 wherein the antenna weight generator is configured to generate antenna weights using control logic that performs at least one of the following functions: minimizes a rate of ACK/NACK, and maximizes a CQI value.

8. The WTRU according to claim 1 wherein the antenna weight generator is configured to generate antenna weights using fuzzy logic.

9. The WTRU according to claim 1 wherein the antenna weight generator is configured to generate antenna weights using trial and error, or an approximate gradient search.

10. The WTRU according to claim 1 wherein the antenna weight generator is configured to generate antenna weights on a condition that at least one of the antenna weights includes a complex phase-related value.

11. A method for transmit diversity in packet data communications, comprising:
    applying an initial transmit antenna weight;
    receiving a link adaptation signal, wherein the link adaptation signal includes at least one of the following signals: a hybrid automatic repeat request (HARQ) acknowledgement signal, a channel quality indicator (CQI) signal, or a serving grant signal;
    computing an average of the received HARQ acknowledgement signals;
    analyzing the link adaptation signal; and
    determining a transmit antenna weight change based upon the analysis of the link adaptation signal, wherein on a condition that the average of the received HARQ acknowledgement signals is greater than or equal to a threshold value, updating a transmit antenna weight a first step size.

12. The method of claim 11 wherein the HARQ acknowledgement signal is a positive acknowledgement (ACK) signal.

13. The method of claim 11 wherein the HARQ acknowledgement signal is a negative acknowledgement (NACK) signal.

14. The method of claim 11 wherein on a condition that the HARQ acknowledgement signal changes from a first type of signal to a second type of signal, a transmit antenna phase rotation reverses direction.

15. The method of claim 14 wherein the first type of signal is a positive acknowledgement (ACK) signal and the second type of signal is a negative acknowledgement (NACK) signal.

16. The method of claim 11, further comprising computing a CQI decision variable.

17. The method of claim 16 wherein the CQI decision variable is computed as an average change of received CQI values.

18. The method of claim 17 wherein the average change of received CQI values measures a trend of CQI value variation.

19. The method of claim 11, further comprising rotating a phase of the transmit antenna weight in a first direction.

20. The method of claim 11, further comprising rotating a phase of the transmit antenna weight in a second direction.

21. The method of claim 11 wherein the serving grant signal includes a relative grant.

22. The method of claim 21, further comprising computing an average relative grant.

23. The method of claim 22, further comprising determining whether the average relative grant is moving upward or downward.

24. The method of claim 23, further comprising maintaining the transmit antenna weights.

25. The method of claim 11, further comprising steering a phase of the transmit antenna weight in a first direction.

26. The method of claim 11 wherein at least one of the HARQ acknowledgement signal, the CQI signal, and the serving grant signal are received in a transmission time interval (TTI).

27. The method of claim 26 wherein the TTI includes an index and the at least one of the HARQ acknowledgement signal, the CQI signal, and the serving grant signal are received in the index of the TTI.

28. A wireless transmit/receive unit (WTRU), comprising:
a transmitter including a plurality of antennas;
an antenna weight generator configured to generate antenna weights based upon received link adaptation signals, wherein the link adaptation signals include at least one of the following signals: a hybrid automatic repeat request (HARQ) acknowledgement signal, a channel quality indicator (CQI) signal, or a serving grant signal; and
a processor configured to compute an average of the received HARQ acknowledgement signals, wherein on a condition that the average of the received HARQ acknowledgement signals is greater than or equal to a threshold value, updating a transmit antenna weight a first step size;
wherein the transmitter is configured to transmit a data packet from the plurality of antennas wherein a selected combination of weights generated by the antenna weight generator is applied to the plurality of antennas in the transmission of the data packet.

29. The WTRU of claim 28 further comprising:
a receiver configured to receive a signal indicating whether the data packet was successfully received for each transmission or retransmission of the data packet; and
the antenna weight generator is configured to use the received signal in generating the applied antenna weights.

30. The WTRU of claim 29 wherein the transmitter includes a first and a second antenna for the transmission and retransmission of the data packet wherein different weights are applied to the first antenna and a fixed weight is applied to the second antenna.

31. The WTRU of claim 30 wherein the transmitter is configured to apply a weight to the first antenna for the transmission of the data packet that is a function of signal phase and to apply a weight to the first antenna for subsequent transmissions that is based on a selected phase increment.

32. A wireless transmit/receive unit (WTRU), comprising:
a transmitter including a plurality of antennas;
an antenna weight generator configured to generate antenna weights based upon received link adaptation signals, wherein the link adaptation signals include at least one of the following signals received from a second WTRU in response to a transmission of a data packet: a hybrid automatic repeat request (HARQ) acknowledgement signal, a channel quality indication (CQI) signal, and a serving grant signal; and
a processor configured to compute an average of the received HARQ acknowledgement signals, wherein on a condition that the average of the received HARQ acknowledgement signals is greater than or equal to a threshold value, updating a transmit antenna weight a first step size;
wherein the transmitter is configured to transmit the data packet from the plurality of antennas wherein a selected combination of weights generated by the antenna weight generator is applied to the plurality of antennas in the transmission of the data packet.

33. A method for transmit diversity in packet data communications, comprising:
applying an initial transmit antenna weight;
receiving a link adaptation signal, wherein the link adaptation signal includes at least one of the following signals: a hybrid automatic repeat request (HARQ) acknowledgement signal, a channel quality indicator (CQI) signal, or a serving grant signal;
computing an average of the received HARQ acknowledgement signals;
analyzing the link adaptation signal; and
determining a transmit antenna weight change based upon the analysis of the link adaptation signal, wherein on a condition that the average of the received HARQ acknowledgement signals is less than a threshold value, updating the transmit antenna weight a second step size.

34. A wireless transmit/receive unit (WTRU), comprising:
a transmitter having a plurality of antennas; and
an antenna weight generator configured to generate antenna weight combinations based upon received link adaptation signals, wherein the link adaptation signal includes at least one of the following signals: a hybrid automatic repeat request (HARQ) acknowledgement signal, a channel quality indicator (CQI) signal, or a serving grant signal; and
a processor configured to compute an average of the received HARQ acknowledgement signals, wherein on a condition that the average of the received HARQ acknowledgement signals is less than a threshold value, updating the transmit antenna weight a second step size.

35. A wireless transmit/receive unit (WTRU), comprising:
a transmitter including a plurality of antennas;

an antenna weight generator configured to generate antenna weights based upon received link adaptation signals, wherein the link adaptation signals include at least one of the following signals: a hybrid automatic repeat request (HARQ) acknowledgement signal, a channel quality indicator (CQI) signal, or a serving grant signal; and
a processor configured to compute an average of the received HARQ acknowledgement signals, wherein on a condition that the average of the received HARQ acknowledgement signals is less than a threshold value, updating the transmit antenna weight a second step size;
wherein the transmitter is configured to transmit a data packet from the plurality of antennas wherein selected combination of weights generated by the antenna weight generator is applied to the plurality of antennas in the transmission of the data packet.

36. A wireless transmit/receive unit (WTRU), comprising:
a transmitter including a plurality of antennas;
an antenna weight generator configured to generate antenna weights based upon received link adaptation signals, wherein the link adaptation signals include at least one of the following signals received from a second WTRU in response to a transmission of a data packet: a hybrid automatic repeat request (HARQ) acknowledgement signal, a channel quality indication (CQI) signal, or a serving grant signal; and
a processor configured to compute an average of the received HARQ acknowledgement signals, wherein on a condition that the average of the received HARQ acknowledgement signals is less than a threshold value, updating the transmit antenna weight a second step size;
wherein the transmitter is configured to transmit the data packet from the plurality of antennas wherein a selected combination of weights generated by the antenna weight generator is applied to the plurality of antennas in the transmission of the data packet.

* * * * *